US008458702B1

(12) United States Patent
Wu et al.

(10) Patent No.: US 8,458,702 B1
(45) Date of Patent: Jun. 4, 2013

(54) METHOD FOR IMPLEMENTING USER SPACE UP-CALLS ON JAVA VIRTUAL MACHINE BEFORE/AFTER GARBAGE COLLECTION

(75) Inventors: Yuguang Wu, Santa Clara, CA (US); Jianming He, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/443,493

(22) Filed: Apr. 10, 2012

Related U.S. Application Data

(60) Provisional application No. 61/604,418, filed on Feb. 28, 2012.

(51) Int. Cl.
*G06F 9/455* (2006.01)
*G06F 12/00* (2006.01)

(52) U.S. Cl.
USPC .............................. 718/1; 707/813; 707/820

(58) Field of Classification Search
None
See application file for complete search history.

(56) References Cited

U.S. PATENT DOCUMENTS

| | | | |
|---|---|---|---|
| 6,760,815 B1 * | 7/2004 | Traversat et al. | 711/135 |
| 6,865,657 B1 | 3/2005 | Traversat et al. | |
| 7,216,137 B2 * | 5/2007 | Shpeisman et al. | 1/1 |
| 7,516,292 B2 | 4/2009 | Kimura et al. | |
| 7,953,773 B2 | 5/2011 | Lindholm et al. | |
| 8,055,846 B2 | 11/2011 | Schwarz et al. | |
| 2003/0236951 A1 | 12/2003 | Choi et al. | |
| 2007/0033365 A1 | 2/2007 | Vaidyanathan et al. | |
| 2008/0046673 A1 | 2/2008 | Hwang | |
| 2010/0318584 A1 * | 12/2010 | Krishnaprasad et al. | 707/813 |

OTHER PUBLICATIONS

T. Graham et al, "Garbage Collection Notification", Jan. 13, 2010, Stack Overflow, available at stackoverflow.com/questions/2057792/garbage-collection-notification (last visited Apr. 10, 2012).
G. Hunt et al.,"An Overview of the Singularity Project", Oct. 2005, Microsoft Research Technical Report MSR-TR-2005-135, Microsoft Research, Redmond, WA, available at research.microsoft.com/pubs/52716/tr-2005-135.pdf (last visited Apr. 10, 2012).
IBM Corporation, "Java Diagnostics Guide 1.4.2.—Heap and Garbage Collection Events", Mar. 29, 2009, IBM Corporation, available at publib.boulder.ibm.com/infocenter/javasdk/v1r4m2/topic/com.ibm.java.doc.diagnostics.142/html/id1586.html (last visited Apr. 10, 2012).
S. Toub, "Debugger Visualizations, Garbage Collection", Aug. 2004 MSDN Magazine, Microsoft, available at msdn.microsoft.com/en-us/magazine/cc163945.aspx (last visited Apr. 10, 2012).
P. Veentjer, "Letting the Garbage Collector Do Callbacks", Jul. 16, 2008, DZone, available at java.dzone.com/articles/letting-garbage-collector-do-c (last visited Apr. 10, 2012).

\* cited by examiner

*Primary Examiner* — Camquy Truong
(74) *Attorney, Agent, or Firm* — McDonnell Boehnen Hulbert & Berghoff LLP

(57) ABSTRACT

Disclosed are apparatus and methods for reporting garbage collection operations. A virtual machine that is executable on a computing device can receive a request to be informed prior to execution of garbage collection software on the computing device via a prior up-call. The virtual machine can receive a request to be informed upon completion of execution of the garbage collection software on the computing device via a post up-call. Prior to the execution of the garbage collection software, the virtual machine can initiate execution of the prior up-call to indicate the garbage collection software is to be executed. After the garbage collection software has completed execution, the virtual machine can initiate execution of the post up-call to indicate the garbage collection software has completed execution.

19 Claims, 10 Drawing Sheets

METHOD FOR IMPLEMENTING USER SPACE UP-CALLS ON JAVA VIRTUAL MACHINE BEFORE/AFTER GARBAGE COLLECTION

CROSS-REFERENCE TO RELATED APPLICATIONS

This application claims priority to U.S. Patent App. No. 61/604,418, filed Feb. 28, 2012, entitled "Method for Implementing User Space Up-Calls on Java Virtual Machine Before/After Garbage Collection", which is incorporated herein by reference for all purposes.

BACKGROUND

Unless otherwise indicated herein, the materials described in this section are not prior art to the claims in this application and are not admitted to be prior art by inclusion in this section.

Modern computer systems can provide support for memory management for executing applications. For example, the computer system can include a run-time system to support execution of software written in a high-level programming language. In some cases, the run-time system includes a "virtual machine" that executes low-level software that corresponds to instructions written in the high-level programming language.

For example, the Java™ computer language is an interpretive language that is executed using a software idealization of a processor called a Java™ Virtual Machine (JVM). The JVM has a built in memory manager for dynamically allocating and freeing up blocks of memory used by JVM application processes. When memory gets scarce, the JVM can call a "garbage collector" tool to locate and free up unused memory. It is not uncommon that garbage collection (GC) can take a relatively-long period of time (e.g., at least several seconds). The JVM typically suspends application processing during garbage collection.

Many computer-based services are provided using a client-server model of computation. When a client wants a service, the client can send an appropriate service request to an appropriate server. The server can process the service request to determine a response to the service request, and send the response to the requesting client. An example use of the client-server model is the World Wide Web, where web pages are delivered by web servers based on service requests from clients operating web browsers.

SUMMARY

In one aspect, a method is provided. A virtual machine that is executable on a computing device receives a prior-garbage-collection information request from an application program that is executable on the computing device. The prior-garbage-collection information request includes a prior up-call. The virtual machine receives a post-garbage-collection information request from the application program. The post-garbage-collection information request includes a post up-call. The virtual machine determines whether garbage collection software is to be executed on the computing device. Upon determining that the garbage collection software is to be executed, the virtual machine initiates execution of the prior up-call for the application program. The virtual machine determines whether the garbage collection software has completed execution on the computing device. Upon determining that the garbage collection software has completed execution, the virtual machine initiates execution of the post up-call for the application program.

In another aspect, a method is provided. An application program that is executable on a computing device sends a request to be informed prior to execution of garbage collection software on the computing device via a prior up-call of the application program. The application program sends a request to be informed upon completion of execution of the garbage collection software on the computing device via a post up-call of the application program. Prior to the execution of the garbage collection software, the application program determines that the prior up-call of the application program has been executed. The prior up-call is configured to send a prior report that the garbage collection software is to be executed. After the garbage collection software has completed execution, the application program determines that the post up-call of the application program has been executed. The post up-call is configured to send a post report that the garbage collection software has completed execution.

In even another aspect, a computing device is provided. The computing device includes a processor and a computer-readable storage medium that is configured to store both garbage collection software and instructions. When executed by the processor, the instructions cause the computing device to carry out functions. The functions include: (a) receiving a prior-garbage-collection information request including information about executing a prior up-call, (b) receiving a post-garbage-collection information request including information about executing a post up-call, (c) determining whether the garbage collection software is to be executed, (d) prior to execution of the garbage collection software, initiating execution of the prior up-call, (e) determining whether the garbage collection software has completed execution, and (f) upon determining that the garbage collection software has completed execution, initiating execution of the post up-call.

In yet another aspect, a method is provided. A load balancer that is executable on a load-balancing computing device monitors a plurality of application programs that are executing on a plurality of computing devices. The plurality of application programs include a first application program executing on a first computing device and a second application program executing on a second computing device. The plurality of computing devices includes both the first and second computing devices. For each computing device in the plurality of computing devices, the load balancer sends a first request to be informed prior to execution of garbage collection software on the computing device and a second request to be informed upon completion of the execution of garbage collection software on the computing device. The load balancer receives a first notification prior to execution of garbage collection software on the first computing device. After receiving the first notification, the load balancer receives a first utilization request to utilize at least one application program. In response to the first notification and the first utilization request, the load balancer: determines that the first application program cannot service the first utilization request and requests that the second application program service the first utilization request. The load balancer receives a second notification upon completion of execution of garbage collection software on the first computing device. After receiving the second notification, the load balancer receives a second utilization request to utilize at least one application program. In response to the second notification and the second utilization request, the load balancer: determines that the first application program can service the second utilization request and requests that the first application program service the second utilization request.

DETAILED DESCRIPTION

Overview

Figure 1A:
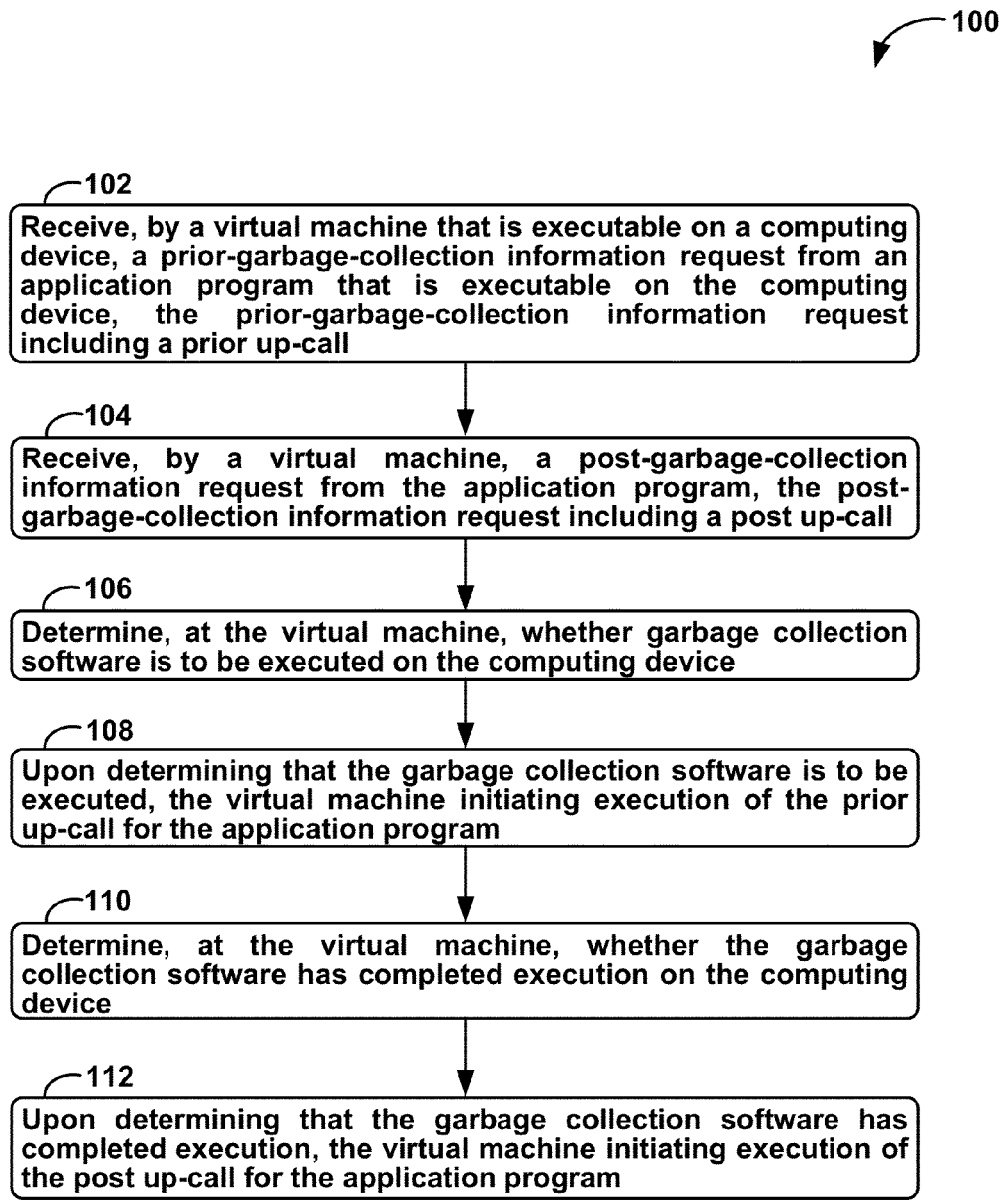
FIG. 1A is a flow chart of a method, in accordance with an example embodiment.

In some cases, servers are implemented in Java and rely upon a Java Virtual Machine (JVM) to execute. The JVM can use an "up-call" mechanism to inform application processes of the JVM, such as the afore-mentioned servers, about garbage collections and perhaps other events. The up-call mechanism permits the JVM to initiate execution of a function, or up-call, in the context of an application process. To initiate the up-call mechanism, an application process can provide the JVM with up-call code and an indication of an event of interest. Example events of interest include but are not limited to, an upcoming execution of a garbage collection (GC) operation or completion of the garbage collection operation.

When the event of interest occurs, the JVM can call the up-call code of the application process. The JVM can execute at a lower layer in the software stack than the application process. So, when the JVM calls the up-call code in the context of the application process, the up-call is executed, as if the up-call code was called by the application process. As a detailed example, when the JVM determines an up-call is to be executed, the JVM can allocate a call stack in the application process's address space, sets a function address to refer to the up-call code, and then execute the up-call code. The up-call code will then execute in the application process's address space using the allocated call stack. In some embodiments, the JVM can allocate a call stack once when the up-call code is provided to the JVM and the call stack can be reused each time the up-call code is executed.

For example, suppose the JVM determines a garbage collection operation is about to begin and that a server has provided up-call code to be executed "prior GC", or just before a garbage collection operation is about to begin. Then, the JVM can execute the up-call code provided by the server to inform the server and others (e.g., clients, load-balancers, etc.) of the impending garbage collection operation. To avoid memory-related problems when free memory is scarce, the up-call code can be "light weight" code, which uses a relatively-small amount of memory. Similarly, this up-call mechanism can be carried out for "post GC" events, or events that indicate that garbage collection has finished. The lightweight restriction on up-call code for post-GC events might not be necessary, as additional memory has been reclaimed by the garbage collection operation.

One implementation of the up-call mechanism can involve JVM applications each registering a callback routine as an up-call with the JVM. The JVM can allow multiple up-calls, and execute all the registered up-calls in the respective user process' context(s). In some embodiments, the order of execution of up-calls can be specified, while in other embodiments, the order of execution of up-calls can be arbitrary.

For example, suppose a server S1, running using Java Virtual Machine JVM1, had two clients C1 and C2, where neither C1 nor C2 use JVM 1. S1 can register up-calls with JVM1 on two events: a prior-GC event for JVM1 and a "post-GC" event. An example prior-GC up-call can include software that instructs JVM1 to send C1 and/or C2 a prior-GC message that garbage collection will soon commence. Similar software can be used for the post-GC up-call. Many other up-calls are possible as well.

In this scenario, further suppose that server S1 decides to keep client C1 informed of prior-GC and post-GC events, but not client C2. Then, upon reception of the prior-GC message at S1, S1 can report the prior-GC event to C1 via a prior-GC message. In response, C1 can choose one or more ameliorative actions, such as seeking servers other than S1, perform other tasks while the garbage collection operation takes place, and/or go to sleep to reduce system resource requirements. In contrast, if C2 requests service from S1 during the garbage collection interval, C2 will be delayed until the garbage collection operation for JVM1 completes and when S1 can serve C2's request.

In other embodiments, load-balancing software can register for notification about prior-GC and/or post-GC events as well. Upon reception of a prior-GC event from a JVM, the load-balancing software can consider any software, including server software, that can utilize the JVM to be temporarily down. Then, the load-balancing software can direct requests away from the software utilizing the JVM until receiving the appropriate post-GC event notification.

For both prior/post GC up-calls, the JVM can take into account available memory at the moment and choose to only execute up-calls whose memory requirements can be fulfilled. This space requirement can either be based on manually specified parameters, or based on an estimate from the JVM based on an analysis of the software for the up-call. Additionally, or instead, to add an additional safety margin, the JVM could initiate GC slightly earlier than usual to accommodate the extra memory consumption to be taken by these up-calls (e.g., set a threshold of a minimum amount of memory that triggers garbage collection to be greater than X MB times the number of up-calls allowed, where X≧a predefined value, such as 1).

EXAMPLE OPERATIONS

Turning to the Figures, FIG. 1A is a flow chart of method 100, in accordance with an example embodiment. Method 100 begins at block 102 where a virtual machine that is executable on a computing device can receive a prior-garbage-collection information request from an application program that is executable on the computing device. The prior-garbage-collection information request can include a prior up-call.

In some embodiments, the application program includes a server. The prior up-call can include software configured to cause the server to: (i) access a prior-report list of clients registered to be informed prior to the execution of the garbage collection software and (ii) for each client on the prior-report list of clients, send the client a prior report that the garbage collection software is about to be executed. In other embodiments, the virtual machine can include the garbage collection software.

At block 104, the virtual machine can receive a post-garbage-collection request to the virtual machine from the application program. The post-garbage-collection request can include a post up-call.

In some embodiments, the application program includes a server. The post up-call can include software configured to cause the server to (i) access a post-report list of clients registered to be informed upon the completion of the execution of the memory management software and (ii) for each client on the post-report list of clients, send the client a post report that the memory management software has completed execution.

In other embodiments, the prior-garbage-collection information request and the post-garbage-collection information request can be received via a single post-prior (PP) request. In particular embodiments, the single post-prior request can include a reference to the prior up-call and a reference to the post up-call.

At block 106, the virtual machine can determine whether the garbage collection software is to be executed on the computing device.

At block 108, upon determining that the memory management software is to be executed, the virtual machine can initiate execution of the prior up-call for the application program.

In some embodiments, the virtual machine can initiate the execution of the prior up-call for the application program by: (i) the application program executing the prior up-call, (i) upon completion of the prior up-call, the application message sending an indication that the prior up-call has completed, (iii) the virtual machine receiving the indication that the prior up-call has completed, (iv) after receiving the indication that the prior up-call has completed, the virtual machine sending an virtual-machine indication to the garbage collection software that the prior up-call has completed; and (v) after receiving the virtual-machine indication that the prior up-call has completed, executing the garbage collection software.

At block 110, the virtual machine can determine whether the garbage collection software has completed execution on the computing device.

At block 112, upon determining that the memory management software has completed execution, the virtual machine can initiate execution of the post up-call for the application program.

In some embodiments, the virtual machine can initiate the execution of the post up-call for the application program by: (i) the application program executing the post up-call, (ii) upon completion of the post up-call, the application message sending an indication that the post up-call has completed, (iii) the virtual machine receiving the indication that the post up-call has completed, and (iv) after receiving the indication that the post up-call has completed, the virtual machine sending an virtual-machine indication to the garbage collection software that the post up-call has completed.

Figure 1B:
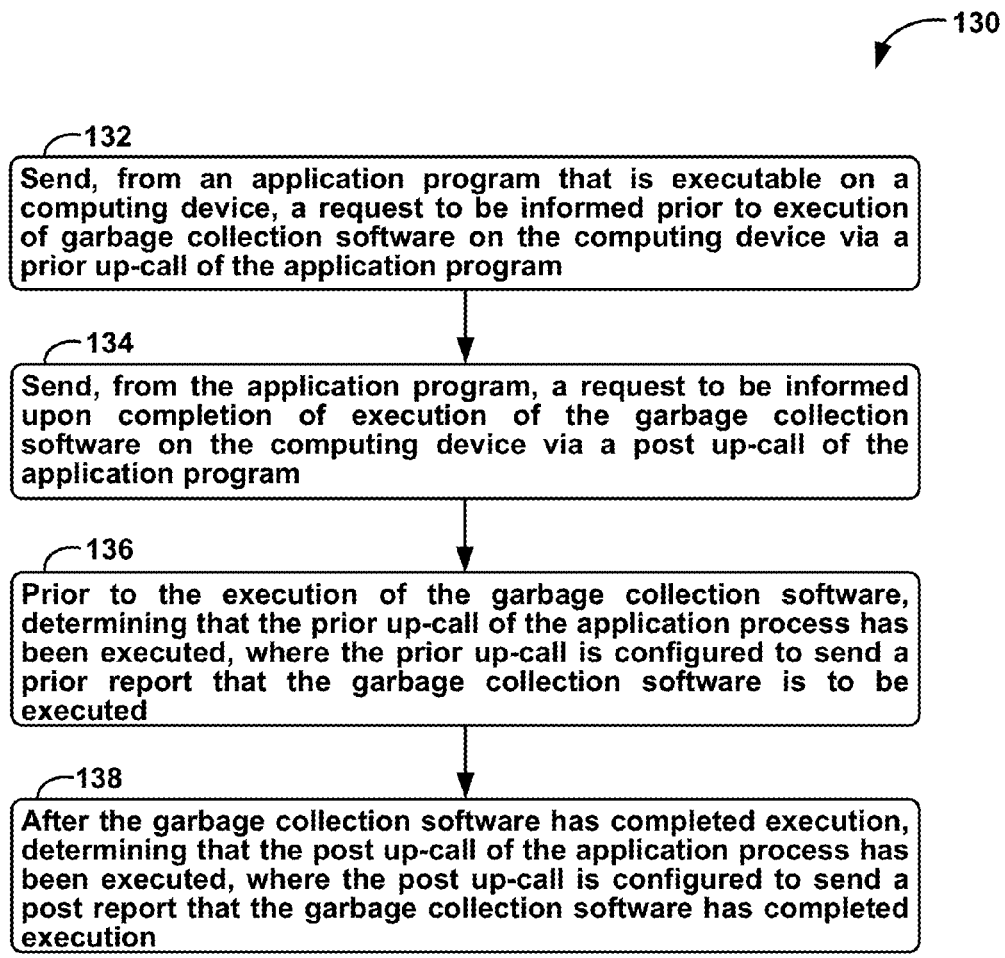
FIG. 1B is a flow chart of another method, in accordance with an example embodiment.

FIG. 1B is a flow chart of method 130, in accordance with an example embodiment. Method 130 begins at block 132, where an application program that is executable on a computing device can send a request to be informed prior to execution of garbage collection software on the computing device via a prior up-call of the application program.

At block 134, the application program can send a request to be informed upon completion of execution of garbage collection software on the computing device via a post up-call of the application program.

At block 136, prior to the execution of the garbage collection software, the application program can determine that the prior up-call of the application program has been executed. The prior up-call can be configured to send a prior report that the garbage collection software is to be executed.

In some embodiments, the application program can include a server. The prior up-call can be configured to send the prior report by: (i) accessing, by the prior up-call, a list of processes connected to the server and (ii) for each process in the list of processes, sending the prior report to the process.

In other embodiments, the prior up-call can be configured to send the prior report by: (i) accessing, by the prior up-call, a prior-report list of clients registered to be informed that the garbage collection software is to be executed and (ii) for each client on the prior-report list of clients, sending the prior report to the client. In particular embodiments, the prior-report list of clients can include a first client. Then, in response to the prior report, the first client can send a service request to a second server, where the second server can differ from the server. In other particular embodiments, the prior-report list of clients can include a first client. Then, in response to the prior report, the first client can inhibit sending service requests to the server.

At block 138, after the garbage collection software has completed execution, the application program can determine that the post up-call has been executed. The post up-call can be configured to send a post report that the garbage collection software has completed execution. In some embodiments, the post up-call can be configured to send the post report to the first client, and where, in response to the post report, the first client can allow sending the service requests to the server. In particular embodiments, after the first client allows sending the service requests to the server, the first client can send a service request to the server.

In other embodiments, the post up-call can be configured to send the post report by: (i) accessing a post-report list of clients registered to be informed that the garbage collection software has completed execution and (ii) for each client on the post-report list of clients, send the post report to the client.

Figure 1C:
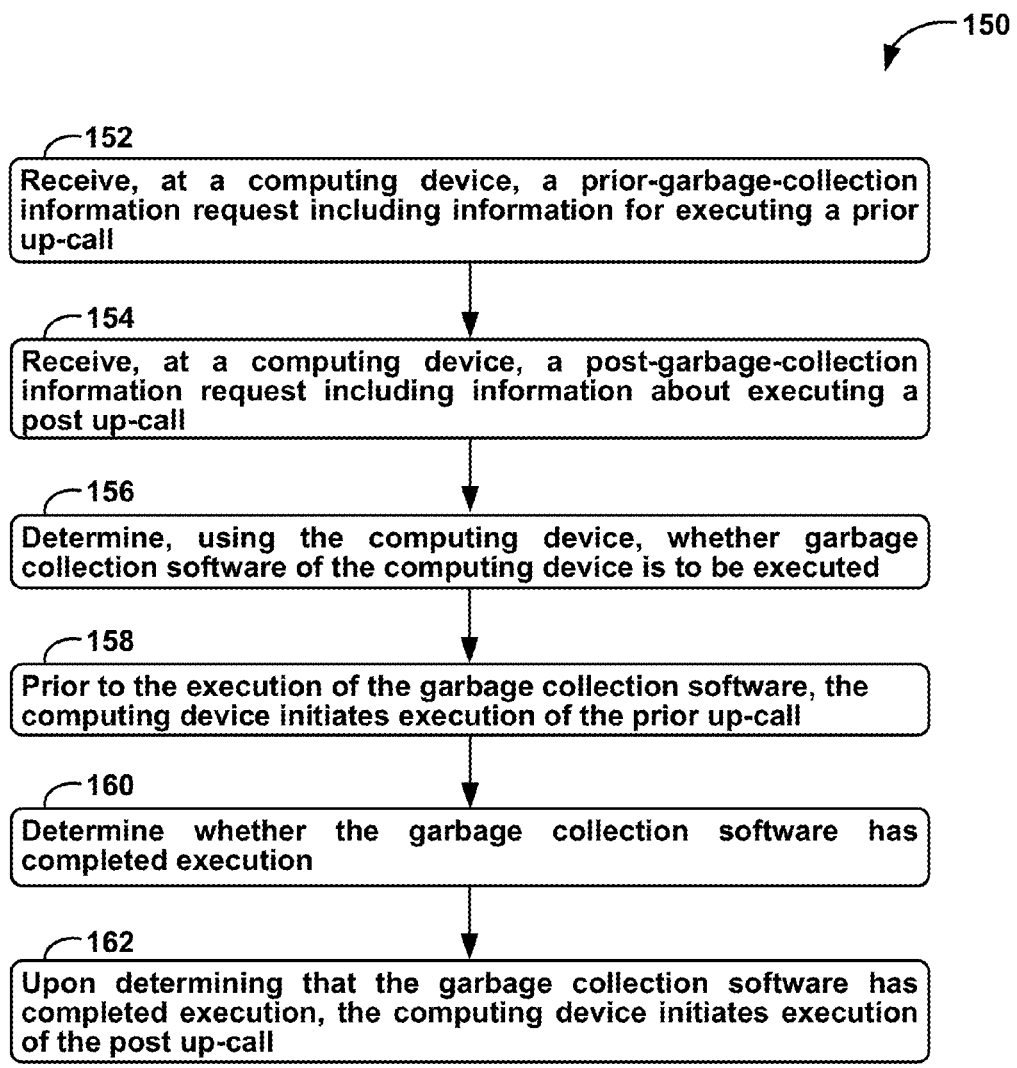
FIG. 1C is a flow chart of yet another method, in accordance with an example embodiment FIG. 1D a flow chart of still another method, in accordance with an example embodiment

FIG. 1C is a flow chart of method 150, in accordance with an example embodiment. Method 150 begins at block 152, where a computing device can receive a prior-garbage-collection information request including information for executing a prior up-call. In other embodiments, the information for executing a prior up-call can include a reference to the prior up-call.

At block 154, the computing device can receive a post-garbage-collection information request including information for executing a post up-call. In some embodiments, the information for executing a post up-call can include a reference to the post up-call.

At block 156, the computing device can determine whether the garbage collection software is to be executed.

At block 158, the computing device can initiate execution of the prior up-call prior to execution of the garbage collection software. In some embodiments, the prior up-call can be configured to send a notification that the garbage collection software is to be executed.

At block 160, the computing device can determine whether the garbage collection software has completed execution.

At block 162, the computing device can initiate execution of the post up-call upon determining that the garbage collection software has completed execution. In some embodiments, the post up-call can be configured to send a notification that the garbage collection software has completed execution.

Figure 1D:
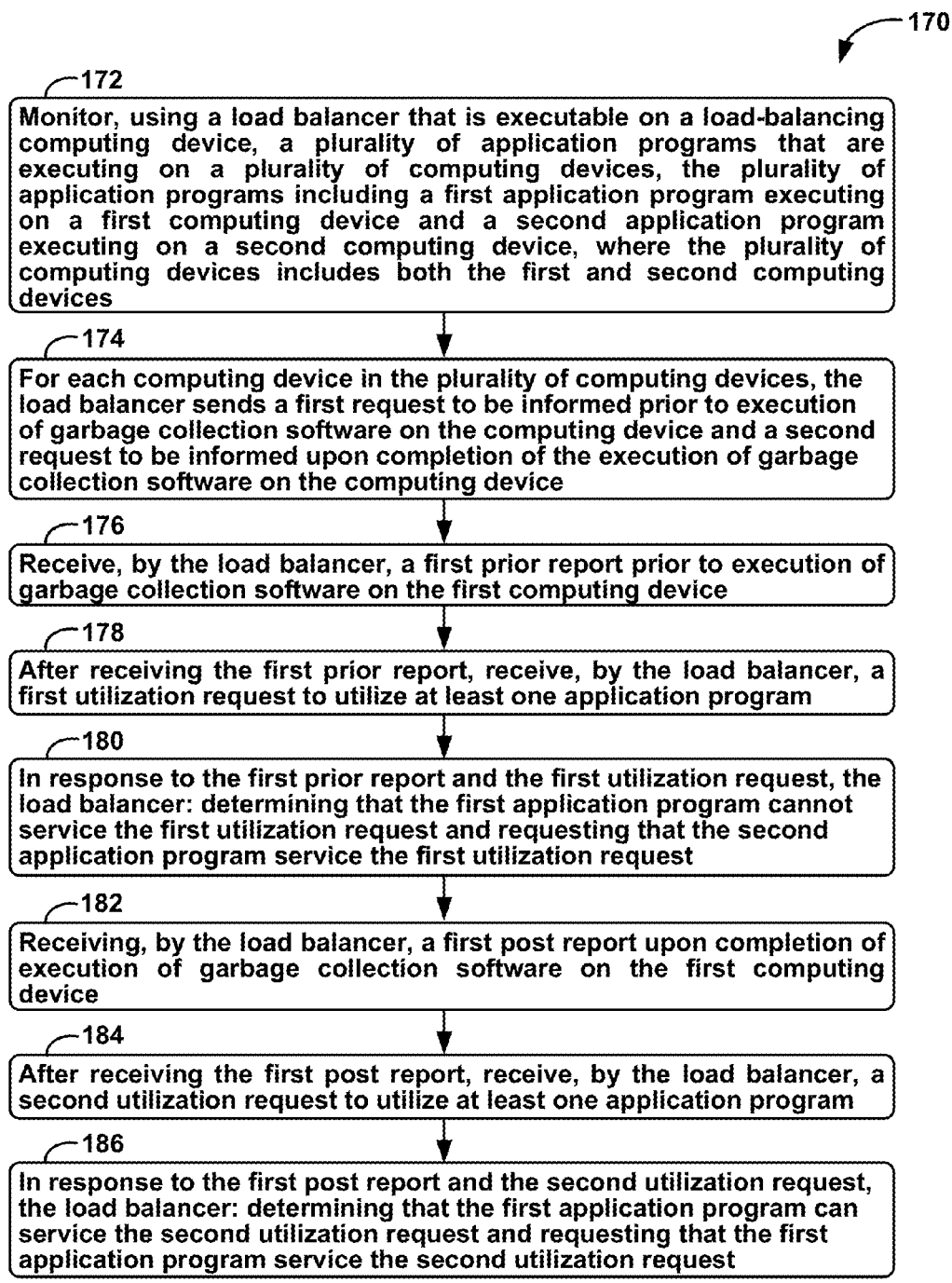

FIG. 1D is a flow chart of method 170, in accordance with an example embodiment. Method 170 begins at block 172, where a load balancer that is executable on a load-balancing computing device, can monitor a plurality of application programs that are executing on a plurality of computing devices. The plurality of application programs can include a first application program executing on a first computing device and a second application program executing on a second computing device. The plurality of computing devices can include both the first and second computing devices.

At block 174, for each computing device in the plurality of computing devices, the load balancer can send a prior-garbage-collection information request to be informed prior to execution of garbage collection software on the computing device and a post-garbage-collection information request to be informed upon completion of the execution of garbage collection software on the computing device.

At block 176, the load balancer can receive a first prior report prior to execution of garbage collection software on the first computing device.

At block 178, after receiving the first prior report, the load balancer can receive a first utilization request to utilize at least one application program.

At block 180, in response to first prior report and the first utilization request, the load balancer can: (i) determine that the first application program cannot service the first utilization request, and (ii) request that the second application program service the first utilization request.

At block 182, the load balancer can receive first post report upon completion of execution of garbage collection software on the first computing device.

At block 184, after receiving the first post report the load balancer can receive a second utilization request to utilize at least one application program.

At block 186, in response to the first post report and the second utilization request, the load balancer can (i) determine that the first application program can service the second utilization request, and (ii) request that the first application program service the utilization request.

In some embodiments, method 170 can include: the load balancer receiving a second prior report prior to execution of garbage collection software on the second computing device. After receiving the second prior report, the load balancer can receive a third utilization request to utilize at least one application program. In response to the second prior report and the third utilization request, the load balancer can: (a) determine that the second application program cannot service the third utilization request and (b) requesting that the first application program service the third utilization request.

In particular embodiments, method 170 can further include: the load balancer receiving a second post report upon completion of execution of garbage collection software on the second computing device. After receiving the second post report, the load balancer can receive a fourth utilization request to utilize at least one application program. In response to the second post report and the fourth utilization request, the load balancer can determine that at least the second application program can service the fourth utilization request and can request that the second application program service the fourth utilization request.

In other embodiments, method 170 can further include: the load balancer receiving one or more prior reports, each prior report received prior to execution of the garbage collection software on a computing device in the plurality of computing devices. For each received prior report, the load balancer can determine that one or more application programs in the plurality of application programs are executing on a computing device associated with the prior report and can mark each of the one or more application programs out of service.

In other particular embodiments, method 170 can further include: the load balancer receiving a fifth utilization request. In response to the fifth utilization request: the load balancer can determine that one or more out-of-service application programs of the plurality of application programs are marked not in service, and can inhibit sending the fifth utilization request to any of the one or more out-of-service application programs.

Example Software Architectures

Figure 2A:
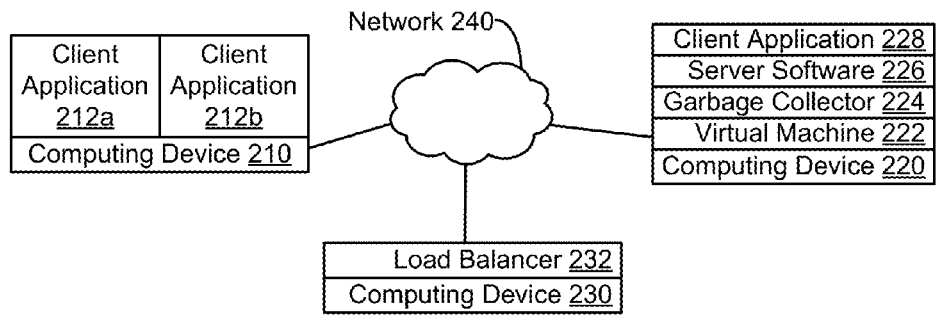
FIG. 2A shows an example network connecting computing devices, in accordance with an example embodiment.

FIG. 2A shows an example network 240 connecting computing devices 210, 220, and 230 in accordance with an example embodiment. Computing device 210 can act as a client device such as shown in FIG. 5 below, at least in part by executing software for client applications 212*a* and/or 212*b*.

Figure 5:
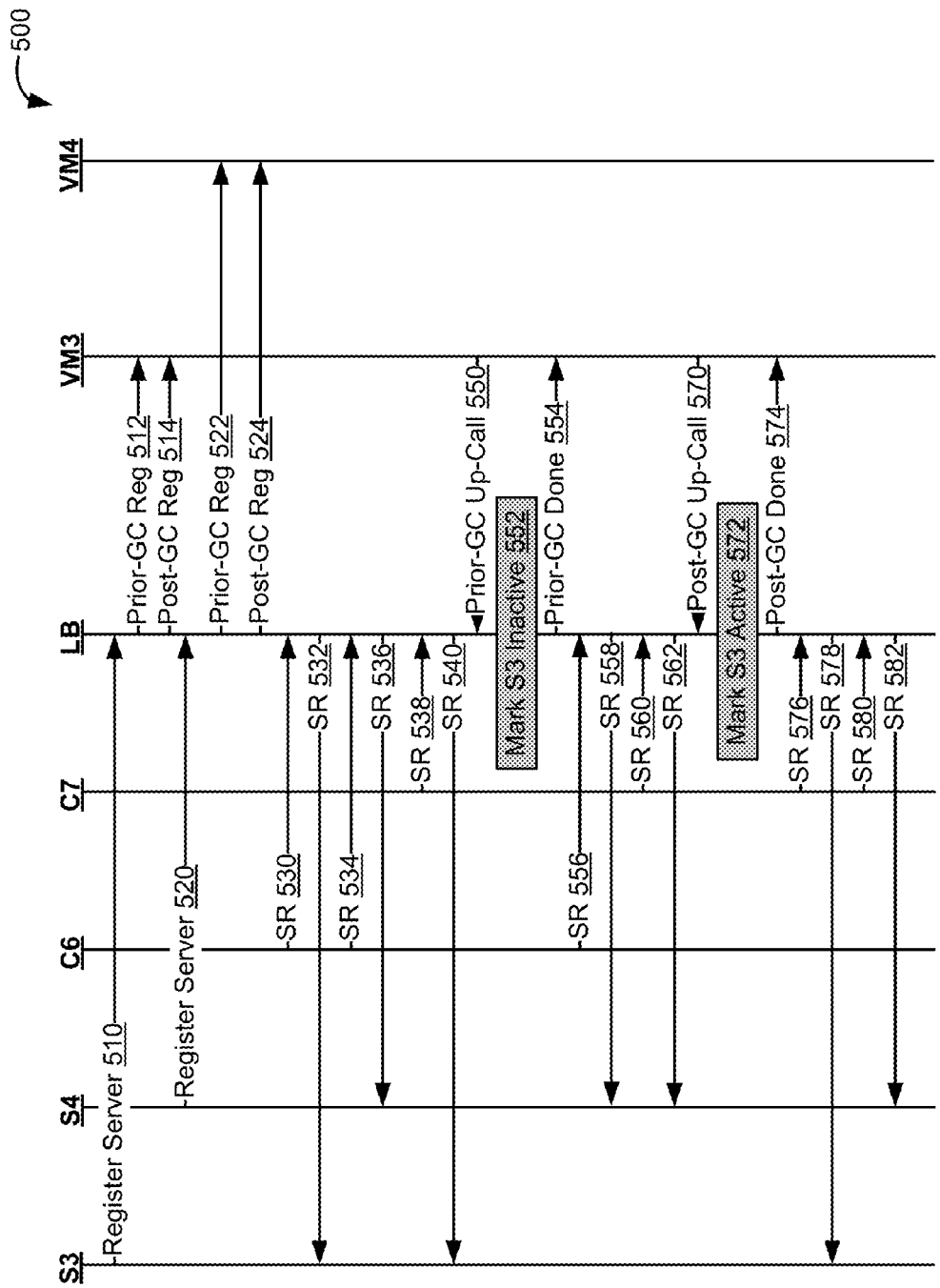
FIG. 5 shows an example scenario for load balancing utilizing information about garbage collection initiation and completion, in accordance with an example embodiment.

Computing device 220 can act as a server device such as shown in FIG. 5 below, at least in part by executing server software 226. Server software 226 can provide one or more services to one or more clients. Example services include but are not limited to web services, media services, database services, other data services, and/or any other service that can utilize a client-server model. Server software 226 can operate by receiving service requests, processing the service requests to generate service responses, and sending the generated service responses. In some embodiments, computing device 220 can also act as a client device by executing software for client application 228.

Server software 226 can be executed by computing device 220 via executing virtual machine 222 and/or garbage collector 224. For example, server software 226 can be written in the Java™ computer language and be executed on a Java™ virtual machine acting as virtual machine 222. During the operation of server software 226, virtual machine 222 and/or other components of computing device 220 can determine that an amount of unused (a.k.a. free) memory is insufficient and then execute garbage collector 224. Garbage collector 224 can be part of a memory manager or other memory management software (not shown in FIG. 2A).

Garbage collector 224 can search part or all of the memory of computing device 220 to determine to "reclaim", or return to free memory, at least a fixed amount of storage (e.g., one megabyte) before stopping. In some embodiments, garbage collector 224 can search a particular region of memory organized using one or more data structures, such as a "heap", usable for memory management operations. In operation, a garbage collector can determine if an object is no longer being referenced or used, and in that case, the garbage collector can select the object for reclamation.

In some embodiments, when garbage collector 224 is operating, memory managed by garbage collector 224 is partially or completely unavailable for use by applications. For example, suppose virtual machine 222 utilizes a heap H1 for dynamic memory allocation for applications executing virtual machine 222. Then, when virtual machine 222 and/or garbage collector 224 determine that H1 has insufficient free memory, garbage collector 224 can search H1 for memory for reclamation. However, during this search, applications, such as server software 226 do not have access to H1 and thus do not have access to memory dynamically allocatable from H1 during application execution. Thus, in general, the applications are unable to execute during a garbage collection operation. In particular embodiments, garbage collector 224 can take a relatively-long period of time (e.g., several seconds or more) to execute.

Computing device 230 can run load balancer 232 to perform load balancing operations. For example, suppose network 240 connects n servers S1, S2, S3 . . . Sn, where each server can provide the same services as the other servers. Then, load balancer 232 can receive service requests on behalf of the n servers, select a server $S_{SEL}$, $1 \leq SEL \leq n$, that can readily handle the service request, and send the received service request to $S_{SEL}$.

Load balancer 232 can select $S_{SEL}$ based on a number of criteria, such as, but not limited to, server activation status (e.g., server is active, degraded, not in service, etc.), server resources, number of service requests being handled by each server, and/or previously selected server(s). For example, load balancer 232 can send service requests to all active servers in a round-robin fashion. As another example, load balancer 232 can send service requests to the m (active) servers currently handling the fewest server requests, where m<n. Many other criteria and examples for load balancing are possible as well.

In particular, suppose that load balancer 232 is configured to send service requests to all active servers in a round-robin fashion and to be informed when garbage collection begins and ends operation on all servers known to load balancer 232. Later, suppose garbage collection is about to begin one or more virtual machines that support servers $S_{GC1}$, $S_{GC2}$, . . . , $S_{GCn}$, with $1 \leq GC_n \leq n$. Once load balancer 232 is informed that garbage collection is about to begin on the virtual machine(s) supporting servers $S_{GC1}$, $S_{GC2}$, . . . , $S_{GCn}$, load balancer 232 can mark one or more servers $S_{GC1}$, $S_{GC2}$, . . . , $S_{GCn}$ temporarily out of service.

While servers $S_{GC1}$, $S_{GC2}$ . . . $S_{GCn}$ are marked out of service, load balancer 232 can inhibit sending service requests to servers $S_{GC1}$, $S_{GC2}$ . . . $S_{GCn}$, as $S_{GC1}$, $S_{GC2}$ . . . $S_{GCn}$ are not active. Later, when load balancer 232 is informed that garbage collection has ended operation on the virtual machine(s) supporting servers $S_{GC1}$, $S_{GC2}$ . . . $S_{GCn}$ load balancer 232 can mark $S_{GC1}$, $S_{GC2}$ . . . $S_{GCn}$ as active. As servers $S_{GC1}$, $S_{GC2}$ . . . $S_{GCn}$ are now active, load balancer 232 can continue sending service requests to the previously out-of-service server(s).

Figure 2B:
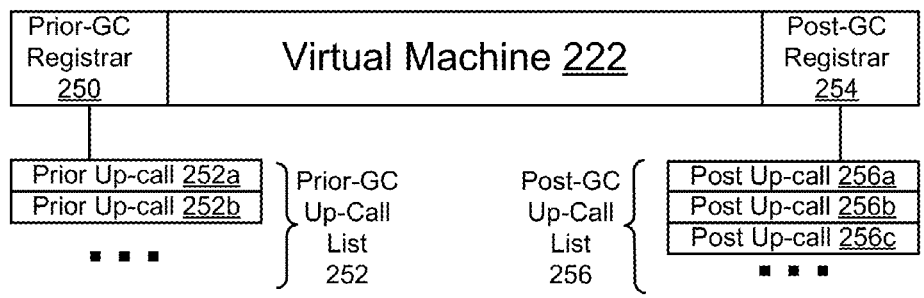
FIG. 2B shows an example virtual machine, in accordance with an example embodiment.

FIG. 2B shows an example virtual machine 222, in accordance with an example embodiment. Virtual machine 222 is shown in FIG. 2B configured with prior-garbage-collection (GC) registrar 250 and post-GC registrar 254. FIG. 2B also shows prior-GC registrar 250 associated with prior-GC up-call list 252 and post-GC registrar 254 associated with post-GC up-call list 256.

Virtual machine 222 is configured to receive requests to be informed prior to execution of memory management software (e.g., a garbage collector) and requests to be informed upon completion of the execution of the memory management software. A request to be informed prior to execution of memory management software can include an up-call or a reference to an up-call. In particular, a request to be informed prior to execution of memory management software can include a "prior up-call" or reference thereof, and a request to be informed upon completion of the execution of the memory management software can include a "post up-call" or reference thereof.

When virtual machine 222 receives a request to be informed prior to execution of memory management software, prior-GC registrar 250 of virtual machine 222 can take a prior up-call from the request and place the prior up-call in prior-GC up-call list 252. Similarly, when virtual machine 222 receives a request to be informed upon completion of the execution of the memory management software, post-GC registrar 254 of virtual machine 222 can take a post up-call from the request and place the post up-call in post-GC up-call list 256.

The use of the term "list" herein to describe prior-GC up-call list 252, post-GC up-call list 256, prior-GC report list 262, post-GC report list 266, and connection list 272, does not imply a data structure to implement any of the herein-described lists. Rather, any suitable data structure, such as but not limited to, a list, linked list, queue, priority queue, stack, array, matrix, heap, object, and layout can be used to implement the herein-described lists.

Once virtual machine 222 is informed prior to the execution of the memory management software, prior-GC registrar 250 can access prior-GC up-call list 252 and "call", or initiate execution, each prior up-call on the prior-GC up-call list 252. FIG. 2B shows two prior up-calls 252a and 252b in prior-GC up-call list 252. In this instance, prior-GC registrar 250 can call up-calls 252a and 252b to inform processes respectively associated with up-calls 252a and 252b about an upcoming execution of memory management software. Once an up-call has been called, prior-GC registrar 250 can either remove the up-call from prior-GC up-call list 252 or leave the up-call in prior-GC up-call list 252 to await a later execution of the memory management software.

Also, upon virtual machine 222 being informed about termination of the execution of the memory management software, post-GC registrar 254 can access post-GC up-call list 256 and "call", or initiate execution, each post up-call on the post-GC up-call list 256. FIG. 2B shows three post up-calls 256a, 256b, and 256c in post-GC up-call list 256. In this instance, post-GC registrar 254 can call up-calls 256a, 256b, and 256c to inform processes respectively associated with up-calls 256a, 256b, and 256c about the termination of execution of memory management software. Once an up-call has been called, post-GC registrar 254 can either remove the up-call from prior-GC up-call list 256 or leave the up-call in prior-GC up-call list 256 to await a later termination of execution of the memory management software.

When virtual machine 222 has completed calling all of the up-calls on a respective up-call list 252, 256, virtual machine 222 can inform the memory management software that all up-calls have been initiated. For example, virtual machine 222 can inform the memory management software after all prior up-calls in prior-GC up-call list 252 have been called. In some embodiments, virtual machine 222 can inform the memory management software after all prior up-calls in prior-GC up-call list 252 have been called and subsequently completed. Virtual machine can similarly inform the memory management software when all post up-calls in post-GC up-call list 256 have been called and perhaps completed.

Figure 2C:
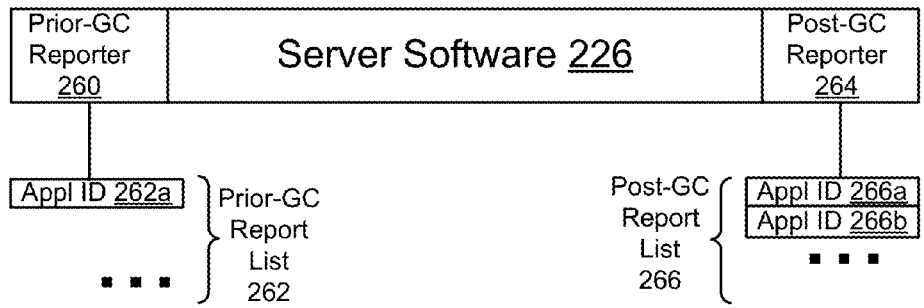
FIG. 2C shows example server software, in accordance with an example embodiment.

FIG. 2C shows example server software 226, in accordance with an example embodiment. Server software 226 is shown in FIG. 2C configured with prior-garbage-collection (GC) reporter 260 and post-GC reporter 264. FIG. 2C also shows prior-GC reporter 260 associated with prior-GC report list 262 and post-GC reporter 264 associated with post report list 266.

Server software 226 is configured to receive requests to be informed prior to execution of memory management software and requests to be informed upon completion of the execution of the memory management software. A request to be informed prior to execution of memory management software can be sent from an application and/or a request to be informed upon completion of the execution of the memory management can be associated with an "application ID." Example application IDs include, but are not limited to, one or more process IDs, uniform resource locators (URLs), uniform resource identifier (URIs), network addresses, port numbers, memory addresses, and/or other identifiers configure to partially or completely identify an application.

When server software 226 receives a request to be informed prior to execution of memory management software, prior-GC reporter 260 of server software 226 can determine the application ID associated with the request and place the application ID in prior-GC report list 262. Similarly, when server software 226 receives a request to be informed upon completion of the execution of the memory management software, post-GC reporter 264 of server software 226 an determine the application ID associated with the request and place the application ID in post-GC report list 266.

Once server software 226 is informed prior to the execution of the memory management software, prior-GC reporter 260 can access prior-GC report list 262 and send a report to each application whose application ID is on the prior-GC report list 262. FIG. 2C shows one application ID 262a in prior-GC report list 262. In this instance, prior-GC reporter 260 can generate a report to inform an application that memory management software is about to begin.

Once generated, prior-GC reporter 260 can send the report to each application on the prior-GC report list 262. In the example shown in FIG. 2C, prior-GC reporter 260 can send the report to an application associated with application ID 262a. After sending the report to an application whose application ID is on prior-GC report list 262, prior-GC reporter 260 can either remove the application ID from prior-GC report list 262 or leave the application ID in prior-GC report list 262 to await a later execution of the memory management software.

Also, upon server software 226 being informed about termination of the memory management software, post-GC reporter 264 can access post-GC report list 266 and send a report to each application whose application ID is on the post-GC report list 266. FIG. 2C shows two application IDs 266a and 266b in post-GC report list 266. In this instance, post-GC reporter 264 can generate a report to inform an application that memory management software has just terminated. Once generated, post-GC reporter 264 can send the report to each application on the post-GC report list 266. In the example shown in FIG. 2C, post-GC reporter 264 can send the message to application respectively associated with application IDs 266a and 266b. After sending message(s) to the application(s), post-GC reporter 264 can either remove the application ID from post-GC report list 266 or leave the application ID in post-GC report list 266 to await a later termination of execution of the memory management software.

When server software 226 has completed reporting to all applications on a respective report list 262, 266, server software 226 can inform the memory management software that all reports have been sent. For example, server software 226 can inform the memory management software after all reports to applications associated with application IDs in prior-GC report list 262 have been sent. Server software 226 can similarly inform the memory management software after sending all reports to applications associated with application IDs in post-GC report list 266.

Figure 2D:
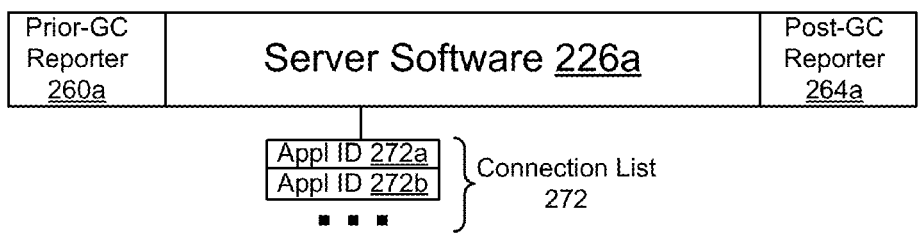
FIG. 2D shows another example of server software, in accordance with an example embodiment.

FIG. 2D shows another example of server software 226a, in accordance with an example embodiment. Server software 226a is shown in FIG. 2D configured with prior-GC reporter 260a, post-GC reporter 264a, and connection list 272. Server software 226a, prior-GC reporter 260a, and post-GC reporter 264a can perform the respective functions described above for server software 260, prior-GC reporter 260, and post-GC reporter 264, but can operate upon connection list 272 instead of, or as well as, prior-GC report list 262 and post-GC report list 262

Connection list 272 can contain information representing processes connected to a server executing server software 226a, e.g., all processes connected to server software 226a via a socket. FIG. 2D shows each process represented in connection list 272 with an application ID.

Once server software 226a is informed prior to the execution of the memory management software, prior-GC reporter 260a can access connection list 272, generate a report to inform an application that memory management software is about to begin, and send the report to each application whose application ID is on the connection list 272. For example, FIG. 2D shows application IDs 272a and 272b in connection list 272 that can receive the report sent by prior-GC reporter 260a.

Upon server software 226a being informed about termination of the memory management software, post-GC reporter 264a can access connection list 272, generate a report to inform an application that memory management software has just terminated, and send the report to each application whose application ID is on the connection list 272. For example, FIG. 2D shows application IDs 272a and 272b in connection list 272 that can receive the report sent by post-GC reporter 264a.

When server software 226a has completed reporting to all applications on connection list 272, server software 226a can inform the memory management software that all reports have been sent. For example, server software 226a can inform the memory management software after prior-GC reporter 260a has sent all reports prior to execution of the memory management software to applications associated with application IDs in connection list 272.

In embodiments not shown in FIGS. 2B-2D, virtual machine 222 can be configured with prior-GC and/or post-GC reporter(s) along with or instead of prior-GC and/or post-GC registrars 250, 254 and/or server software 226, 226a can be configured with prior-GC and/or post-GC registrar(s) along with or instead of prior-GC and/or post-GC reporters 260, 260, 264, 264a. In still other embodiments not shown in FIGS. 2B-2D, memory management software and/or a garbage collector can be configured with prior-GC and/or post-GC registrars and/or prior-GC and/or post-GC reporters. In further embodiments not shown in FIGS. 2B-2D, prior-GC and post-GC reporters can be combined into a single reporter that operates on a report list. For example, the combined reporter can act as prior-GC reporter 260 while operating on prior-GC report list 262 and the combined reporter can act as post-GC reporter 264 while operating on post-GC report list 262. In further embodiments not shown in FIGS. 2B-2D, the functionality of prior-GC register 250 and post-GC registrar 254 can be combined as well.

Example Garbage Collection Information Scenarios

Figure 3:
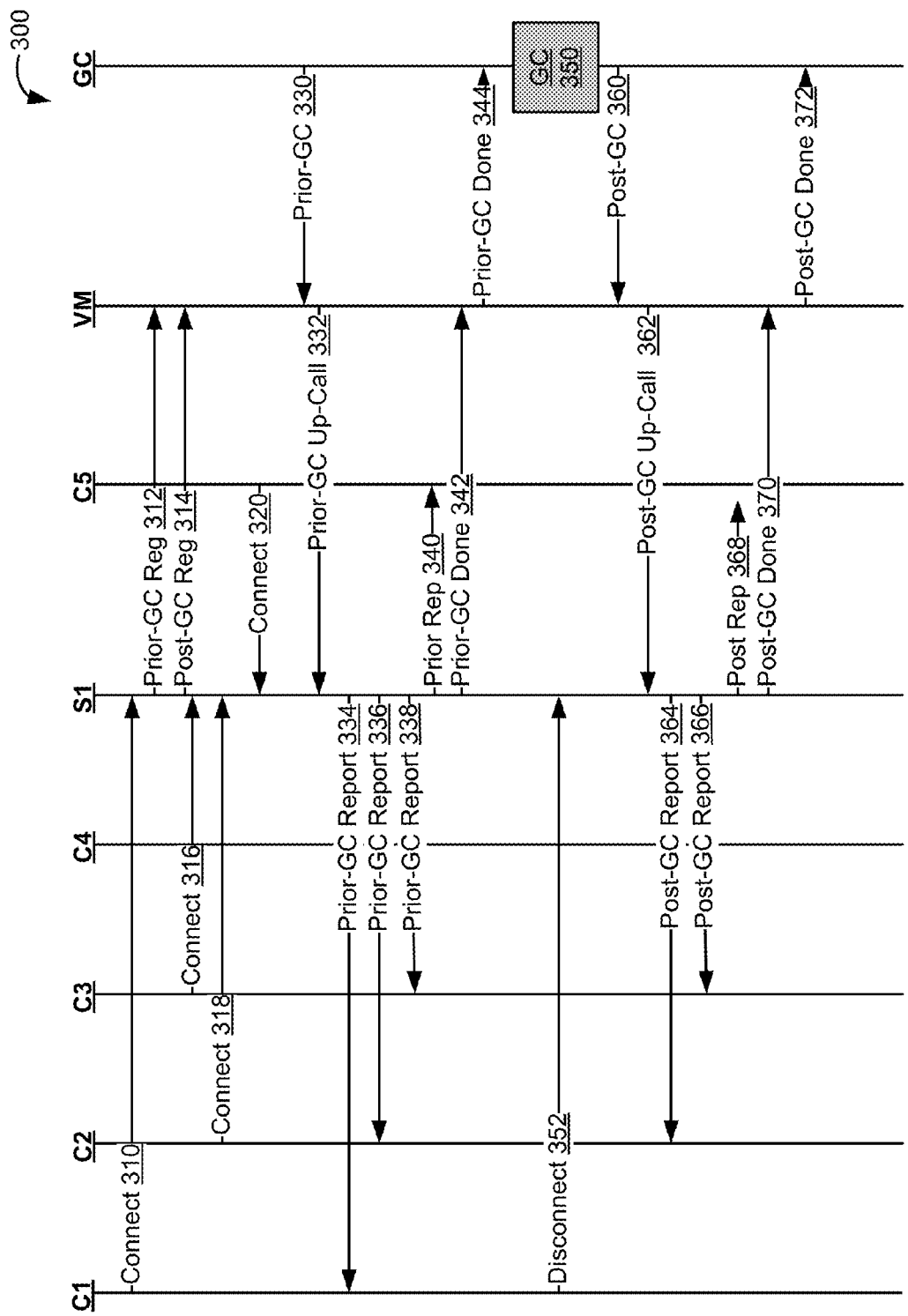
FIG. 3 shows an example scenario for informing servers and clients about garbage collection initiation and completion, in accordance with an example embodiment

FIG. 3 shows scenario 300 for informing server S1 and clients C1, C2, C3, C4, and C5 about garbage collection initiation and completion, in accordance with an example embodiment. In scenario 300, server S1 is embodied as an application program executing using virtual machine VM on a computing device (not shown in FIG. 3) that uses garbage collector GC.

Scenario 300 begins with client C1 sending connect message 310 to connect to server S1. For example, connect message 310 can be part of client C1 establishing a network socket connection with server S1. Server S1 can interpret connect message 310 from a client, such as C1, in part as a request to be informed when garbage collection is about to begin for server S1 and/or to be informed when garbage collection has completed for server S1.

In response, server S1 sends prior-GC registration 312 to register a prior-GC up-call with virtual machine VM. The prior-GC up-call can be a function, reference to a function, and/or other software related to server S1 that can be called by virtual machine VM. Upon reception of prior-GC registration 312, a prior-GC registrar of virtual machine VM can register the prior-GC up-call for server S1.

In an additional response to connect message 310, server S1 sends post-GC registration 314 to register a post-GC up-call with virtual machine VM. The post-GC up-call can be a function, reference to a function, and/or other software related to server S1 that can be called by virtual machine VM. Upon reception of post-GC registration 314, a post-GC registrar of virtual machine VM can register the post-GC up-call for server S1.

Also in response to connect message 310, a connection between client C1 and server S1 can be established. For example, client C1 can send service requests to server S1 via the connection and, in some embodiments, receive responses to service requests from server S1 via the connection. Additionally, an application ID for client C1 can be added to a connection list for server S1.

Scenario 300 continues with client C3 sending connect message 316 to server S1, client C2 sending connect message 318 to server S1, and client C5 sending connect message 320 to server S1. In part, server S1 can interpret connect messages 316, 318, and 320 as a request from respective clients C3, C2, and C5 to be informed when garbage collection is about to begin for server S1 and/or to be informed when garbage collection has completed for server S1. Additionally, respective connections between server S1 and clients C3, C2, and C5 can be established and respective application IDs for clients C3, C2, and C5 can be added to the connection list for server S1. As with client C1, clients C2, C3, and C5 can send service requests to server S1 via their respective connections, and, in some embodiments, receive responses to service requests from server S1 via their respective connections.

Scenario 300 continues with garbage collector GC sending prior-GC message 330 to virtual machine VM, informing virtual machine VM that a garbage collection operation is about to begin. In response, virtual machine VM calls each up-call on the prior-GC up-call list. In particular, as shown in FIG. 3, virtual machine VM calls prior-GC up-call 332 for server S1.

By calling prior-GC up-call 332 for server S1, virtual machine VM "invokes" the prior-GC up-call or initiates execution of the prior-GC up-call for server S1 provided as part of prior-GC registration 312. In some embodiments, virtual machine VM can invoke the prior-GC up-call by initiating execution of the prior-GC up-call, or perhaps by dereferencing a reference to the prior-GC up-call and then initiating execution of the dereferenced prior-GC up-call. In other embodiments, virtual machine VM can invoke the prior-GC up-call using a remote procedure call (RPC) or similar mechanism. The prior-GC up-call will then execute in server S1's "context" or memory space associated with server S1. For example, the prior-GC up-call can read and write variables, objects, and other data for server S1.

In response to, or during execution of prior-GC up-call 332, server S1 generates a prior-GC report and sends the generated prior-GC report to each application whose application ID is on the connection list for server S1. FIG. 3 shows a prior-GC report is sent to client C1 as prior-GC report 334, to client C2 as prior-GC report 336, to client C3 as prior-GC report 336, and to client C5 as prior-GC report 340. Upon sending the prior-GC reports and subsequent completion of prior-GC up-call 332, server S1 can inform virtual machine VM that prior-GC up-call has completed via prior-GC done message 342. Then, virtual machine VM can inform garbage collector GC that the prior-GC activities for virtual machine VM are completed via prior-GC done message 344.

Upon reception of prior-GC done message 344 and perhaps after receiving prior-GC done messages from other virtual machines, garbage collector GC can perform garbage collection 350. Upon completion of garbage collection 350, garbage collector GC can use post-GC message 360 to inform virtual machine VM of garbage collection completion.

In scenario 300, client C1 sends disconnect message 352 to server S1 to remove the connection between client C1 and server S1 during garbage collection 350. In part, server S1 can interpret disconnect message 352 as a request from client C1 not to be informed when garbage collection is about to begin for server S1 and not to be informed when garbage collection has completed for server S1. Additionally, the connection between server S1 and client C1 can be taken down and the application ID for client C1 can be removed from the connection list for server S1. In some embodiments, server S1 may not take any action in response to disconnect message 352 until garbage collection completes. In scenario 300, server S1 disconnects the connection with client C1 and removes client C1's application ID from the connection list before receiving post-GC message 360.

In response to post-GC message 360, FIG. 3 shows that virtual machine VM can call post-GC up-call 362 for server S1. By calling post-GC up-call 362 for server S1, virtual machine VM initiates execution of the post-GC up-call for server S1 provided as part of post-GC registration 314. In some embodiments, virtual machine VM can invoke the post-GC up-call by initiating execution of the post-GC up-call or by dereferencing a reference to the post-GC up-call, and then initiating execution of the dereferenced post-GC up-call. In other embodiments, virtual machine VM can remotely invoke the post-GC up-call for server S1 using a remote procedure call (RPC) to server S1 or similar mechanism. As with the prior-GC up-call, the post-GC up-call will execute in server S1's context.

In response to, or during execution of post-GC up-call 362, server S1 generates a post-GC report and sends the generated post-GC report to each application whose application ID is on the connection list for server S1. FIG. 3 shows a post-GC report is sent to client C2 as post-GC report 364, to client C3 as post-GC report 366, and to client C5 as post-GC report 368. However, client C1 does not receive a post-GC report due to sending disconnect message 352 and subsequent removal of client C1's application ID from the application list for server S1. Upon sending the post-GC reports and subsequent completion of post-GC up-call 362, server S1 can inform virtual machine VM that post-GC up-call has completed via post-GC done message 370. Then, virtual machine VM can inform garbage collector GC that the post-GC activities for virtual machine VM are completed via post-GC done message 372.

Figure 4:
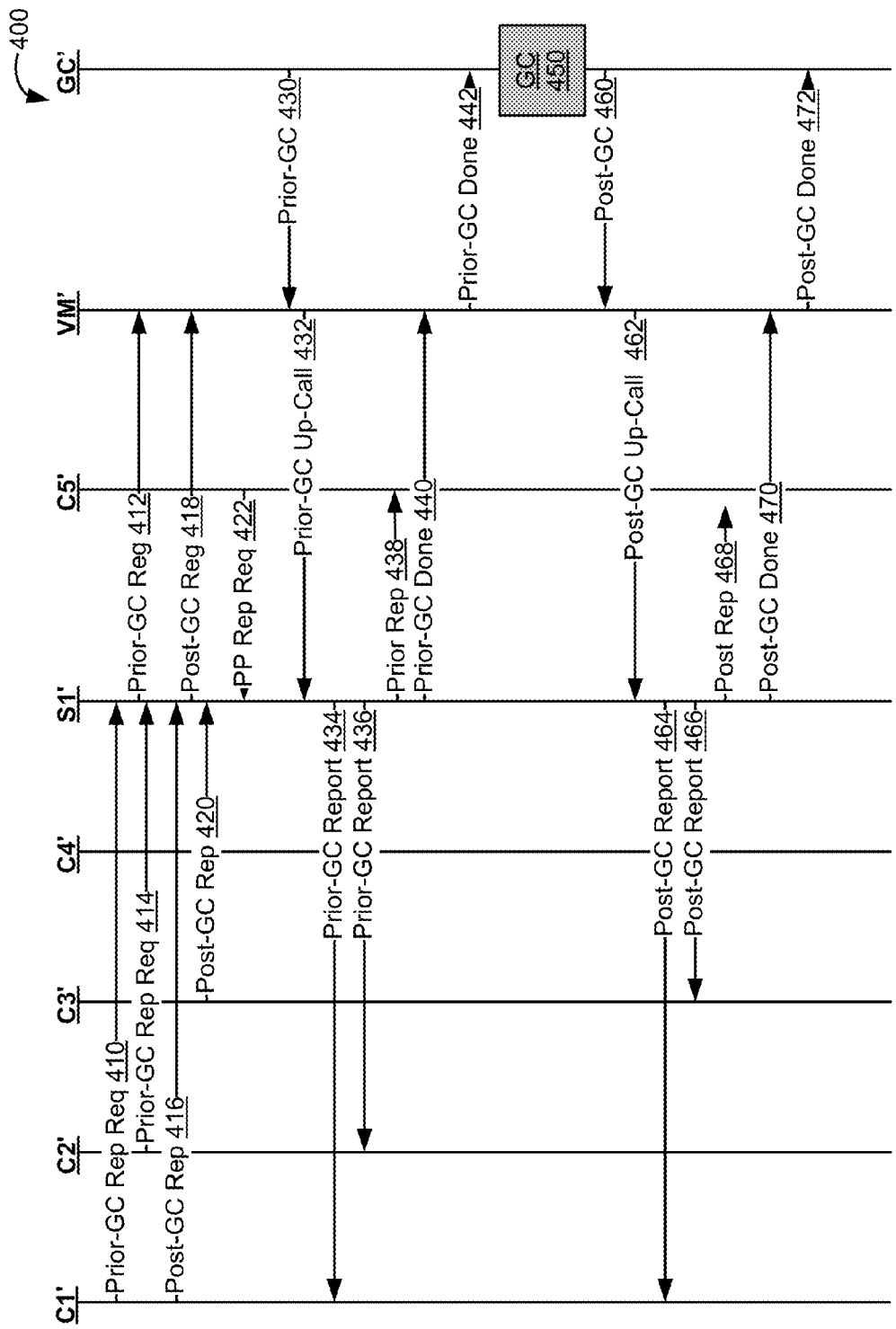
FIG. 4 shows another example scenario for informing servers and clients about garbage collection initiation and completion, in accordance with an example embodiment.

FIG. 4 shows scenario 400 for informing server S1' and clients C1', C2', C3', C4', and C5' about garbage collection initiation and completion, in accordance with an example embodiment. In scenario 400, server S1' is embodied as an application program executing using virtual machine VM' on a computing device (not shown in FIG. 4) that uses garbage collector GC'.

Scenario 400 begins with client C1' sending a prior-GC report request 410 message to server S1', requesting to be informed when garbage collection is about to begin for server S1'. In response, server S1' sends prior-GC registration 412 to register a prior-GC up-call with virtual machine VM'. Upon reception of prior-GC registration 412, a prior-GC registrar of virtual machine VM' can register the prior-GC up-call for server S1'. Additionally in response to prior-GC report request 410, a prior-GC reporter of server S1' can store an application ID for client C1' in a prior-GC report list for server S1'.

Scenario 400 continues with client C2' sending a prior-GC report request 414 message to server S1', requesting to be informed when garbage collection is about to begin for server S1'. In response, a prior-GC reporter of server S1' can store an application ID for client C2' in a prior-GC report list for server S1'.

In scenario 400, client C1' sends a post-GC report request 416 message to server S1', requesting to be informed when garbage collection has just completed for server S1'. In response, server S1' sends post-GC registration 418 to register a post-GC up-call with virtual machine VM'. Upon reception of post-GC registration 418, a post-GC registrar of virtual machine VM' can register the post-GC up-call for server S1'. Additionally in response to post-GC report request 416, a prior-GC reporter of server S1' can store an application ID for client C1' in a post-GC report list for server S1'.

Scenario 400 continues with client C3' communicating a post-GC report request 420 message to server S1', requesting to be informed when garbage collection has just completed for server S1'. In response, a post-GC reporter of server S1' can store an application ID for client C3' in a post-GC report list for server S1'.

Next, client C5' sends prior/post (PP) report request 422 to server S1'. PP report request 422 is a request to server S1' to inform client C5' both prior to and after (post) garbage collection on server S1'. In response to PP report request 422, a prior-GC reporter of server S1' can store an application ID for client C5' in a prior-GC report list for server S1' and a post-GC reporter of server S1' can store the application ID for client C5' in a post-GC report list for server S1'. In some embodiments, server S1' can maintain a prior-post-GC report list of application IDs for reporting to applications both prior to and after garbage collection on server S1'.

Scenario 400 continues with garbage collector GC' sending prior-GC message 430 to virtual machine VM', informing virtual machine VM' that a garbage collection operation is about to begin. In response, virtual machine VM' calls each up-call on the prior-GC up-call list. In particular, as shown in FIG. 4, virtual machine VM' calls prior-GC up-call 432 for server S1'.

In response to, or during execution of prior-GC up-call 432, server S1' generates a prior-GC report and sends the generated prior-GC report to each application whose application ID is on the prior-GC list (and prior-post-GC report list, if utilized). FIG. 4 shows a prior-GC report is sent to client C1' as prior-GC report 434, to client C2' as prior-GC report 436, and to client C5' as prior-GC report 438. Upon sending the prior-GC reports and subsequent completion of prior-GC up-call 432, server S1' can inform virtual machine VM' that prior-GC up-call has completed via prior-GC done message 440. Then, virtual machine VM' can inform garbage collector GC' that the prior-GC activities for virtual machine VM' are completed via prior-GC done message 442.

Upon reception of prior-GC done message 442 and perhaps after receiving prior-GC done messages from other virtual machines, garbage collector GC' can perform garbage collection 450. Upon completion of garbage collection 450, garbage collector GC' can use post-GC message 460 to inform virtual machine VM' of garbage collection completion.

In response to post-GC message 460, FIG. 4 shows that virtual machine VM' can call post-GC up-call 462 for server S1'. In response to, or during execution of post-GC up-call 462, server S1' generates a post-GC report and sends the generated post-GC report to each application whose application ID is on the post-GC list (and prior-post-GC report list, if utilized). FIG. 4 shows a post-GC report is sent to client C1' as post-GC report 464, to client C3' as post-GC report 466, and to client C5' as post-GC report 468. Upon sending the post-GC reports and subsequent completion of post-GC up-call 462, server S1' can inform virtual machine VM' that post-GC up-call has completed via post-GC done message 470. Then, virtual machine VM' can inform garbage collector GC that the post-GC activities for virtual machine VM' are completed via post-GC done message 472.

FIG. 5 shows scenario 500 for load balancing utilizing information about garbage collection initiation and completion, in accordance with an example embodiment. During scenario 500, server S3 runs on virtual machine VM3, server S4 runs on virtual machine VM4, and load balancer LB and clients C6 and C7 run on different computing device(s) than the computing device(s) executing virtual machines VM3 and VM4. In scenario 500, load balancer LB uses a load-balancing algorithm to relay incoming service requests (SRs) to registered, active servers in a round-robin fashion.

Scenario 500 begins with server S3 registering with load balancer LB as a server via register server message 510. In response to register server message 510, load balancer LB registers server S3 as a server for later service requests (SRs). Additionally, load balancer LB sends prior-GC registration message 512 and post-GC registration message 514 to virtual machine VM3 to register, respectively, a prior-GC up-call and a post-GC up-call with virtual machine VM3.

Load balancer LB can maintain a mapping, or similar structure, to determine server(s) are associated with virtual machines. An example mapping for the servers and virtual machines involved in scenario 500 is shown in Table 1 below.

TABLE 1

| Virtual Machine | Server |
|---|---|
| VM3 | S3 |
| VM4 | S4 |

In some embodiments not shown in FIG. 5, a virtual machine can host multiple servers. In other embodiments not shown in the Figures, load balancer LB can register with a server, such as server S3, to be informed prior to execution of garbage collection software and/or upon completion of the execution of garbage collection software using the techniques discussed above in the context of at least FIGS. 2C and 3.

Scenario 500 continues with server S4 registering with load balancer LB as a server via register server message 520. In response to register server message 520, load balancer LB registers server S4 as a server for later service requests. Additionally, load balancer LB sends prior-GC registration message 522 and post-GC registration message 524 to virtual machine VM4 to register, respectively, a prior-GC up-call and a post-GC up-call with virtual machine VM4.

FIG. 5 shows that scenario 500 continues with client C6 sending service request 530 to load balancer LB. At this point in scenario 500, load balancer has two active servers—S3 and S4—registered that can handle service request 530. In accordance with the round-robin load-scheduling algorithm, load balancer LB selects server S3 as a destination for the service request and relays the service request as service request 532 to server S3. Load balancer then receives service request 534 from client C6. In accordance with the round-robin load-scheduling algorithm, load balancer LB selects server S5 as a destination for the service request and relays the service request as service request 532 to server S4. Similarly, upon reception of service request 538 from client C7, load-balancer selects, in round-robin fashion, server S3 as a destination for the service request, and relays the service request as service request 540 to server S3.

Scenario 500 continues with virtual machine VM3 determining that a garbage collection operation is about to commence. In response, virtual machine VM3 calls prior-GC up-call 550 for load balancer LB. In response to, or as part of prior-GC up-call 550 executing on load balancer LB, load balancer marks 552 server S3 as (temporarily) inactive, since server S3 is executing on virtual machine VM3 and VM3 will be subject to garbage collection, and informs 554 virtual machine VM3 that prior-GC up-call 550 has completed.

As server S3 is now marked inactive, load balancer LB only has one registered and active server, server S4, to handle incoming service requests. Thus, while server S3 is marked inactive, load balancer LB receives service requests 556 and 560, selects server S4 as a destination for both service requests, and relays the service requests to server S4 as respective service requests 558 and 562.

Scenario 500 continues with the completion of garbage collection operation for virtual machine VM3. Then, virtual machine VM3 responsively calls post-GC up-call 570 for load balancer LB. In response to, or as part of prior-GC up-call 570 executing on load balancer LB, load balancer LB marks 572 server S3 as active, since server S3 is executing on virtual machine VM3, which has returned to service after completion of the garbage collection. Then, load balancer LB informs 574 virtual machine VM3 that post-GC up-call 570 has completed.

As server S3 is now marked active, load balancer LB has two registered and active servers, server S3 and S4, to handle incoming service requests. Thus, load balancer LB can select servers S3 and S4 in a round-robin fashion as destinations for service requests. FIG. 5 shows that load balancer LB receives service request 576, selects server S3 as a destination for the service request, and relays the service request as service request 578 to server S3. Subsequently, load balancer LB receives service request 580, selects server S4 as a destination for the service request in accord with the round-robin load-balancing algorithm, and relays the service request as service request 582 to server S4.

Example Data Network

Figure 6:
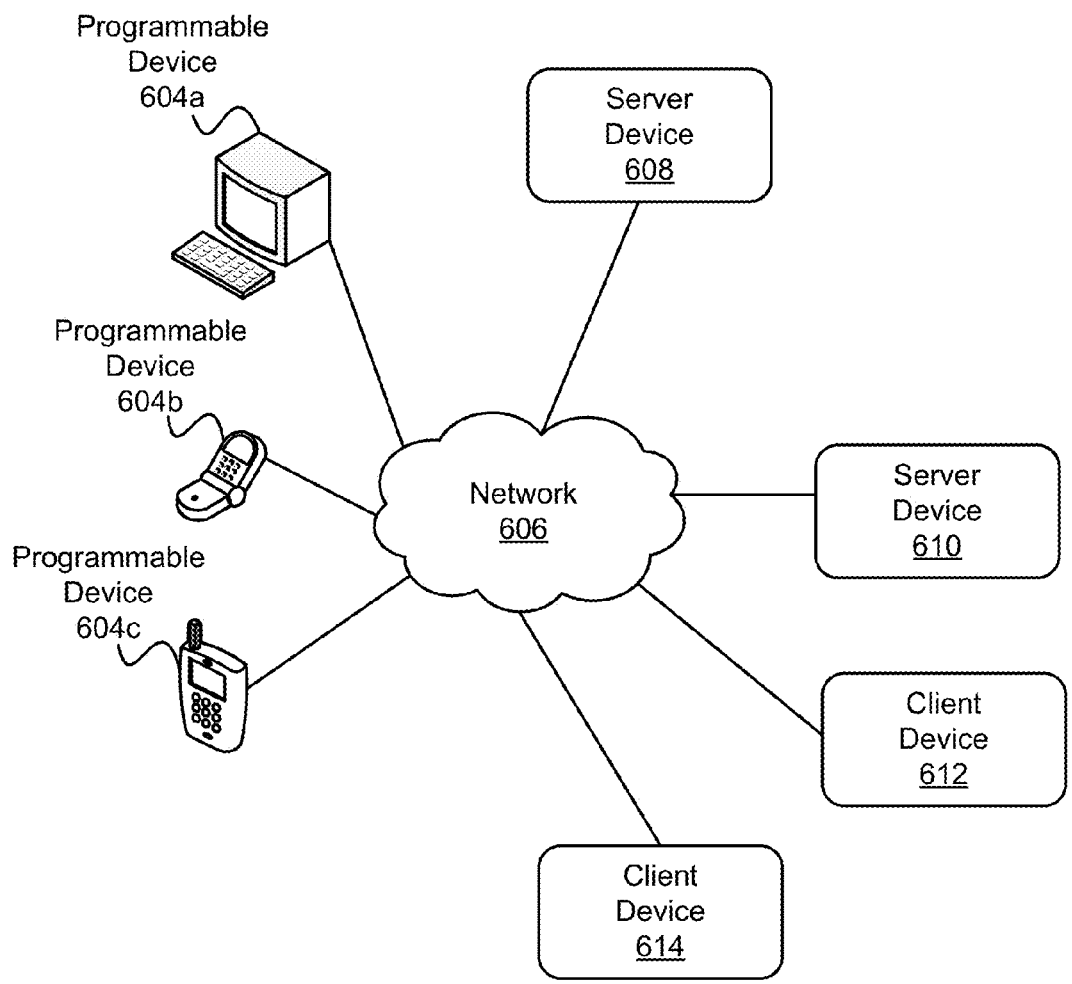
FIG. 6 depicts a distributed computing architecture in accordance with an example embodiment.

FIG. 6 shows server devices 608, 610 configured to communicate, via network 606, with programmable devices 604a, 604b, and 604c. Network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet.

Although FIG. 6 only shows three programmable devices, distributed application architectures may serve tens, hundreds, or thousands of programmable devices. Moreover, programmable devices 604a, 604b, and 604c (or any additional programmable devices) may be any sort of computing device, such as an ordinary laptop computer, desktop computer, network terminal, wireless communication device (e.g., a cell phone or smart phone), and so on. In some embodiments, programmable devices 604a, 604b, and 604c may be dedicated to the design and use of software applications. In other embodiments, programmable devices 604a, 604b, and 604c may be general purpose computers that are configured to perform a number of tasks and need not be dedicated to software development tools.

Server devices 608, 610 can be configured to perform one or more services, as requested by programmable devices 604a, 604b, and/or 604c. For example, server device 608 and/or 610 can provide content to programmable devices 604a-604c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 608 and/or 610 can provide programmable devices 604a-604c with access to software for database, search, computation, graphical, audio, video, World Wide Web/Internet utilization, and/or other functions. Many other examples of server devices are possible as well.

Computing Device Architecture

Figure 7A:
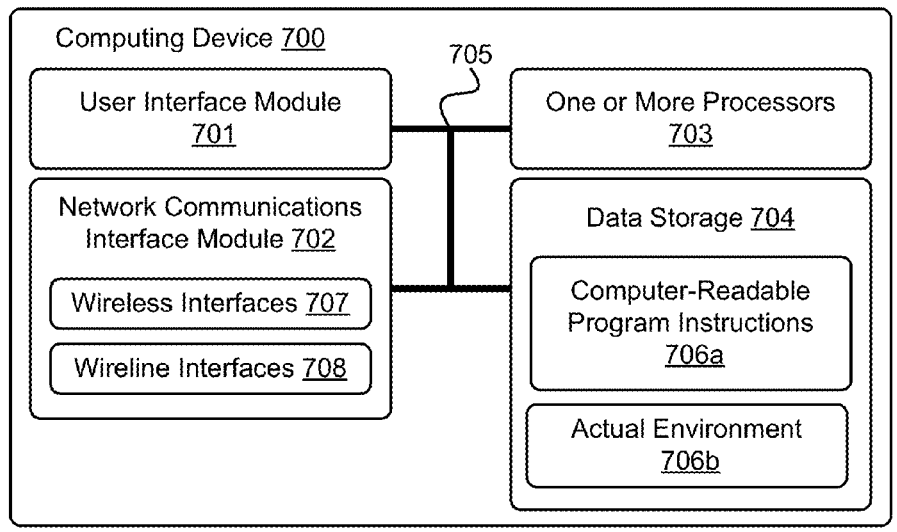
FIG. 7A is a block diagram of a computing device in accordance with an example embodiment.

FIG. 7A is a block diagram of a computing device (e.g., system) in accordance with an example embodiment. In particular, computing device 700 shown in FIG. 7A can be configured to perform one or more functions of computing devices 210, 220, 230, client devices 612, 614, server devices 608, 610, network 606, and/or one or more of programmable devices 604a, 604b, and 604c. Computing device 700 may include a user interface module 701, a network-communication interface module 702, one or more processors 703, and data storage 704, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706a that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706a, actual environment 706b, and perhaps additional data. Actual environment 706b can store at least some of the data used by one or more processes and/or threads of a software application. In some embodiments, data storage 704 can additionally include storage required to perform at least part of the herein-described methods and techniques and/or at least part of the functionality of the herein-described devices and networks.

Cloud-Based Servers

Figure 7B:
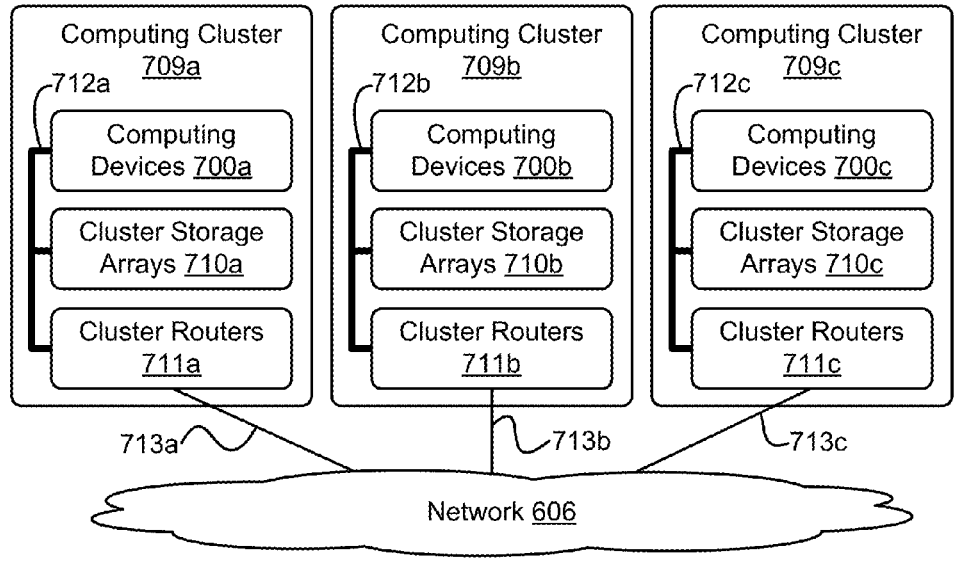
FIG. 7B depicts a cloud-based server system in accordance with an example embodiment.

FIG. 7B depicts a network 606 of computing clusters 709a, 709b, 709c arranged as a cloud-based system in accordance with an example embodiment. Server devices 608 and/or 610 can be cloud-based devices that store program logic and/or data of cloud-based applications and/or services. Client devices 612 and/or 614 can be devices utilize services, program logic, and/or data provided by server devices 608 and/or 610. In some embodiments, server devices 608 and 610 can be a single computing device residing in a single computing center. In other embodiments, server device 608 or 610 can include multiple computing devices in a single computing center, or even multiple computing devices located in multiple computing centers located in diverse geographic locations. For example, FIG. 6 depicts each of server devices 608 and 610 residing in different physical locations.

Similarly, in some embodiments, client devices 612 and 614 can reside on a single computing device. In other embodiments, client devices 612 and/or 614 can include multiple computing devices in a single computing center, or even multiple computing devices located in multiple computing centers located in diverse geographic locations.

In some embodiments, data and services at server devices 608 and/or 610 can be encoded as computer-readable information stored in non-transitory, tangible computer-readable media (or computer-readable storage media) and accessible by programmable devices 604a, 604b, and 604c, client devices 612 and 614 and/or other computing devices. In some embodiments, data at server devices 608 and/or 610 can be stored on a single disk drive or other tangible computer-readable storage media, or can be implemented on multiple disk drives or other tangible computer-readable storage media located at one or more diverse geographic locations.

FIG. 7B depicts a cloud-based server system in accordance with an example embodiment. In FIG. 7B, the functions of server device 608 and/or 610 can be distributed among three computing clusters 709a, 709b, and 708c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of computing devices 210, 220, and/or 230, server devices 608 and/or 610 and/or client devices 612 and/or 614. In one embodiment, the various functionalities of computing devices 210, 220, and/or 230, server devices 608 and/or 610 and/or client devices 612 and/or 614 can be distributed among one or more of computing devices 700a, 700b, and 700c. Computing devices 700b and 700c in computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with computing devices 210, 220, and/or 230, server devices 608 and/or 610 and/or client devices 612 and/or 614 can be distributed across computing devices 700a, 700b, and 700c based at least in part on the processing requirements of computing devices 210, 220, and/or 230, server devices 608 and/or 610 and/or client devices 612 and/or 614, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 608 and/or 610 can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of server device 608, while other cluster storage arrays can store data of server device 610. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 701a via the local cluster network 712a, and (ii) wide area network communications between the computing cluster 709a and the computing clusters 709b and 709c via the wide area network connection 713a to network 606. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable storage medium such as a storage device including a disk, hard drive, and/or other storage medium.

The computer-readable storage media may also include non-transitory computer-readable storage media that stores data for short periods of time like register memory, processor cache, and random access memory (RAM). The computer-readable storage media may also include non-transitory computer-readable storage media that stores program code and/or data for longer periods of time, such as secondary or persistent long term storage, like read only memory (ROM), optical or magnetic disks, compact-disc read only memory (CD-ROM), for example. The computer-readable storage media may also be any other volatile or non-volatile storage systems. A non-transitory computer-readable storage medium may be considered a computer-readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
receiving, by a virtual machine that is executable on a computing device, a prior-garbage-collection information request from an application program that is executable on the computing device, the prior-garbage-collection information request comprising a prior up-call, wherein the prior up-call comprises prior up-call code of the application program;
receiving, by the virtual machine, a post-garbage-collection information request from the application program prior to execution of garbage collection software, the post-garbage-collection information request comprising a post up-call;
determining, using the virtual machine, whether the garbage collection software is to be executed on the computing device;
upon determining that the garbage collection software is to be executed, the virtual machine initiating execution of the prior up-call code of the application program in an address space of the application program;
determining, using the virtual machine, whether the garbage collection software has completed execution on the computing device; and
upon determining that the garbage collection software has completed execution, the virtual machine initiating execution of the post up-call for the application program;
wherein the virtual machine initiating the execution of the prior up-call for the application program comprises:
the application program executing the prior up-call;
upon completion of the prior up-call, the application program sending an indication that the prior up-call has completed:
the virtual machine receiving the indication that the prior up-call has completed; after receiving the indication that the prior up-call has completed, the virtual machine sending an virtual-machine indication that the prior up-call has completed to the garbage collection software; and
after receiving the virtual-machine indication that the prior up-call has completed, executing the garbage collection software.

2. The method of claim 1, wherein the application program comprises a server, and
wherein the prior up-call comprises software configured to cause the server to:
access a prior-report list of clients registered to be informed prior to the execution of the garbage collection software; and
for each client on the prior-report list of clients, send the client a prior report that the garbage collection software is about to be executed.

3. The method of claim 1, wherein the application program comprises a server, and
wherein the post up-call comprises software configured to cause the server to:
access a post-report list of clients registered to be informed upon the completion of the execution of the garbage collection software; and
for each client on the post-report list of clients, send the client a post report that the garbage collection software has completed execution.

4. The method of claim 1, wherein the virtual machine initiating the execution of the post up-call for the application program comprises:
the application program executing the post up-call;
upon completion of the post up-call, the application program sending an indication that the post up-call has completed;
the virtual machine receiving the indication that the post up-call has completed; and
after receiving the indication that the post up-call has completed, the virtual machine sending a virtual-machine indication that the post up-call has completed to the garbage collection software.

5. The method of claim 1, wherein the virtual machine comprises the garbage collection software.

6. The method of claim 1, wherein the prior-garbage-collection information request and the post-garbage-collection information request are received via a single post-prior (PP) request.

7. The method of claim 6, wherein the single post-prior request comprises a reference to the prior up-call and a reference to the post up-call.

8. A method, comprising:
sending, from an application program that is executable on a computing device, a request to be informed prior to execution of garbage collection software on the computing device via a prior up-call of the application program, wherein the prior up-call comprises prior up-call code of the application program;
sending, from the application program, a request to be informed upon completion of execution of the garbage collection software on the computing device via a post up-call of the application program, wherein the request to be informed upon completion of execution of the garbage collection software is sent prior to execution of the garbage collection software;
prior to the execution of the garbage collection software, determining that the prior up-call code of the application program has been executed in an address space of the application program, wherein the prior up-call is configured to send a prior report that the garbage collection software is to be executed; and
after the garbage collection software has completed execution, determining that the post up-call of the application program has been executed,
wherein the post up-call is configured to send a post report that the garbage collection software has completed execution;
wherein the virtual machine initiating the execution of the prior up-call for the application program comprises:
the application program executing the prior up-call;
upon completion of the prior up-call, the application program sending an indication that the prior up-call has completed;
the virtual machine receiving the indication that the prior up-call has completed; after receiving the indication that the prior up-call has completed, the virtual machine sending an virtual-machine indication that the prior up-call has completed to the garbage collection software; and
after receiving the virtual-machine indication that the prior up-call has completed, executing the garbage collection software.

9. The method of claim 8, wherein the application program comprises a server, and
wherein the prior up-call is configured to send the prior report by:
accessing, by the prior up-call, a list of processes connected to the server; and
for each process in the list of processes, sending the prior report to the process.

10. The method of claim 8, wherein the application program comprises a server, and wherein the prior up-call is configured to send the prior report by:
- accessing, by the prior up-call, a prior-report list of clients registered to be informed that the garbage collection software is to be executed; and
- for each client on the prior-report list of clients, sending the prior report to the client.

11. The method of claim 10, wherein the prior-report list of clients comprises a first client,
- wherein, in response to the prior report, the first client sends a service request to a second server, and
- wherein the second server differs from the server.

12. The method of claim 11, wherein the post up-call is configured to send the post report to the first client, and
- wherein, in response to the post report, the first client allows sending the service requests to the server.

13. The method of claim 10, wherein the prior-report list of clients comprises a first client, and wherein, in response to the prior report, the first client inhibits sending service requests to the server.

14. The method of claim 8, wherein the post up-call is configured to send the post report by:
- accessing, by the post up-call, a post-report list of clients registered to be informed that the garbage collection software has completed execution; and
- for each client on the post-report list of clients, sending the post report to the client.

15. A computing device, comprising:
- a processor; and
- a computer-readable storage medium configured to store both garbage collection software and instructions that, when executed by the processor, cause the computing device to carry out functions comprising:
  - receiving a prior-garbage-collection information request comprising information for executing prior up-call code for an application program,
  - receiving a post-garbage-collection information request comprising information about executing a post up-call prior to execution of the garbage collection software, determining whether the garbage collection software is to be executed, prior to execution of the garbage collection software, initiating execution of the prior up-call code in an address space of the application program,
    - determining whether the garbage collection software has completed execution,
  - and upon determining that the garbage collection software has completed execution, initiating execution of the post up-call;
    - wherein the virtual machine initiating the execution of the prior up-call for the application program comprises:
    - the application program executing the prior up-call;
    - upon completion of the prior up-call, the application program sending an indication that the prior up-call has completed:
    - the virtual machine receiving the indication that the prior up-call has completed; after receiving the indication that the prior up-call has completed, the virtual machine sending an virtual-machine indication that the prior up-call has completed to the garbage collection software; and
    - after receiving the virtual-machine indication that the prior up-call has completed, executing the garbage collection software.

16. The computing device of claim 15, wherein the information for executing the prior up-call comprises a reference to the prior up-call.

17. The computing device of claim 15, wherein the prior up-call is configured to send a notification that the garbage collection software is to be executed.

18. The computing device of claim 15, wherein the information for executing the post up-call comprises a reference to the post up-call.

19. The computing device of claim 15, wherein the post up-call is configured to send a notification that the garbage collection software has completed execution.

* * * * *